(12) United States Patent
Canney et al.

(10) Patent No.: US 12,267,254 B2
(45) Date of Patent: *Apr. 1, 2025

(54) DIGITAL TWIN FOR DISTRIBUTING DECENTRALIZED COMPUTE RESOURCES

(71) Applicant: Oracle International Corporation, Redwood Shores, CA (US)

(72) Inventors: Jason Loring Canney, Broomfield, CO (US); Alexander Staples-Moore, Manchester, NH (US); Hilary Joy Traut, Broomfield, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,245

(22) Filed: May 3, 2024

(65) Prior Publication Data

US 2024/0323142 A1 Sep. 26, 2024

Related U.S. Application Data

(63) Continuation of application No. 18/186,434, filed on Mar. 20, 2023, now Pat. No. 12,010,037.

(51) Int. Cl.
*H04L 47/783* (2022.01)
*H04L 9/00* (2022.01)
*H04L 47/76* (2022.01)

(52) U.S. Cl.
CPC .............. *H04L 47/783* (2013.01); *H04L 9/50* (2022.05); *H04L 47/76* (2013.01)

(58) Field of Classification Search
None
See application file for complete search history.

(56) References Cited

U.S. PATENT DOCUMENTS

| | | | |
|---|---|---|---|
| 2021/0081938 A1* | 3/2021 | Falk | H04L 9/3247 |
| 2021/0133073 A1 | 5/2021 | Reineke et al. | |
| 2022/0150072 A1* | 5/2022 | Jacob | G06F 21/64 |

(Continued)

FOREIGN PATENT DOCUMENTS

CN 115113998 A * 9/2022

OTHER PUBLICATIONS

Notice of Allowance for U.S. Appl. No. 18/186,434, dated Feb. 21, 2024.

(Continued)

*Primary Examiner* — Atta Khan

(74) *Attorney, Agent, or Firm* — MUGHAL GAUDRY & FRANKLIN PC

(57) ABSTRACT

The present disclosure relates to systems and methods for distributing decentralized compute resources. Compute resource metadata that identifies a set of decentralized compute resources can be received. A request to use one or more compute resources can be received. A digital twin can be generated. The digital twin can facilitate identification of a particular compute resource, and the digital twin can be representative of potential interactions between a receiver entity and a set of provider entities. An interaction can be initiated between the receiver entity and a particular provider entity. The interaction may involve allocating the particular compute resource from the particular provider entity to the receiver entity in response to the request.

20 Claims, 7 Drawing Sheets

(56) References Cited

U.S. PATENT DOCUMENTS

2023/0336367 A1\* 10/2023 Panikkar .................. H04L 9/50
2024/0012954 A1\* 1/2024 Greunke ............... G06T 19/006

OTHER PUBLICATIONS

International Search Report and Written Opinion for PCT Application No. PCT/US2024/016196, dated May 31, 2024.

Tan, C. et al., "Digital Twin Based Remote Resource Sharing in Internet of Vehicles using Consortium Blockchain," 2021 IEEE 94th Vehicular Technology Conference (VTC2021-Fall), Norman, OK, USA, 2021, pp. 1-6.

\* cited by examiner

DIGITAL TWIN FOR DISTRIBUTING DECENTRALIZED COMPUTE RESOURCES

TECHNICAL FIELD

The present disclosure relates to systems and methods for managing decentralized compute resources. More particularly, the present disclosure relates to systems and methods that involve a digital twin for distributing decentralized compute resources.

CLAIM FOR PRIORITY

This application claims priority to U.S. Non-Provisional patent application Ser. No. 18/186,434, filed on Mar. 20, 2023, titled "DIGITAL TWIN FOR DISTRIBUTING DECENTRALIZED COMPUTE RESOURCES," which is incorporated by reference in its entirety for all purposes.

BACKGROUND

Computing devices can be manufactured with varying levels of computing resources. For example, a computer server may have significantly larger amounts of computer memory and computer processing power than a mobile computing device.

However, modern computer programs, modern computer applications, and other modern software are generating a need for computing resources that far exceeds computing resources offered by a single mobile computing device, or even a single computer server. For example, augmented reality and virtual reality programs require low latency and high bandwidth that may not be offered by a single computing device. Cloud computing servers may be used to address the lack of computing resources, but an exponentially increasing need for computing resources, for example from an exponentially increasing number of device users engaging with augmented reality and/or virtual reality programs, may render cloud computing servers unable to provide the needed low latency and high bandwidth.

SUMMARY

In some embodiments, a computer-implemented method is provided for distributing decentralized compute resources. Compute resource metadata that identifies a set of decentralized compute resources can be received. Each decentralized compute resource in the set of decentralized compute resources can be available to be distributed, and each decentralized compute resource in the set of decentralized compute resources can be associated with a different provider entity of a set of provider entities. A request to use one or more compute resources can be received from a receiver entity. Based on the request, a digital twin can be generated. The digital twin can facilitate identification of a particular compute resource of the set of decentralized compute resources, and the digital twin can be representative of a set of potential interactions that include potential interactions between the receiver entity and each provider entity of the set of provider entities. An interaction can be initiated by using the digital twin. The interaction can be between the receiver entity and a particular provider entity of the set of provider entities, and the interaction can involve allocating the particular compute resource from the particular provider entity to the receiver entity in response to the request.

In some embodiments, generating the digital twin can involve (i) determining, based on the receiver entity, a potential interaction type associated with the receiver entity, and (ii) generating the digital twin that is specific to the potential interaction type. In some embodiments, each potential interaction of the set of potential interactions can be characterized by the potential interaction type of the digital twin.

In some embodiments, the compute resource metadata can include (i) an address of each decentralized compute resource in the set of decentralized compute resources, (ii) a capacity of each decentralized compute resource in the set of decentralized compute resources, and (iii) identification information for a provider entity of the set of provider entities that corresponds to each decentralized compute resource in the set of decentralized compute resources.

In some embodiments, initiating the interaction can include (i) determining, by using the digital twin, an amount of non-computing resources to be transferred prior to initiating the interaction, and (ii) facilitating a transfer of the amount of non-computing resources to a blockchain from the receiver entity. In some embodiments, the particular compute resource is an optimized compute resource. Additionally, initiating the interaction can involve allocating the optimized compute resource from the particular provider entity to the receiver entity in response to facilitating the transfer of the amount of non-computing resources to a blockchain from the receiver entity.

In some embodiments, generating the digital twin can involve (i) determining, based on the receiver entity, a potential interaction type associated with the receiver entity, (ii) accessing a pre-existing digital twin that is specific to the potential interaction type, and (iii) adjusting the pre-existing digital twin based on the compute resource metadata and based on the request to generate the digital twin.

In some embodiments, a computer-program product is provided that is tangibly embodied in a non-transitory machine-readable storage medium and that includes instructions configured to cause one or more data processors to perform various operation. The operations can include receiving compute resource metadata that can identify a set of decentralized compute resources. Each decentralized compute resource in the set of decentralized compute resources can be available to be distributed, and each decentralized compute resource in the set of decentralized compute resources can be associated with a different provider entity of a set of provider entities. The operations can include receiving, from a receiver entity, a request to use one or more compute resources. The operations can include generating, based on the request, a digital twin that can facilitate identification of a particular compute resource of the set of decentralized compute resources. The digital twin can be representative of a set of potential interactions that include potential interactions between the receiver entity and each provider entity of the set of provider entities. The operations can include initiating, by using the digital twin, an interaction between the receiver entity and a particular provider entity of the set of provider entities. The interaction can involve allocating the particular compute resource from the particular provider entity to the receiver entity in response to the request.

In some embodiments, a system is provided that includes one or more data processors and a non-transitory computer readable storage medium including instructions which, when executed on the one or more data processors, cause the one or more data processors to perform various operations. The system can receive compute resource metadata that can identify a set of decentralized compute resources. Each decentralized compute resource in the set of decentralized compute resources can be available to be distributed, and each decentralized compute resource in the set of decentralized compute resources can be associated with a different provider entity of a set of provider entities. The system can receive, from a receiver entity, a request to use one or more compute resources. The system can generate, based on the request, a digital twin that can facilitate identification of a particular compute resource of the set of decentralized compute resources. The digital twin can be representative of a set of potential interactions that include potential interactions between the receiver entity and each provider entity of the set of provider entities. The system can initiate, by using the digital twin, an interaction between the receiver entity and a particular provider entity of the set of provider entities. The interaction can involve allocating the particular compute resource from the particular provider entity to the receiver entity in response to the request.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
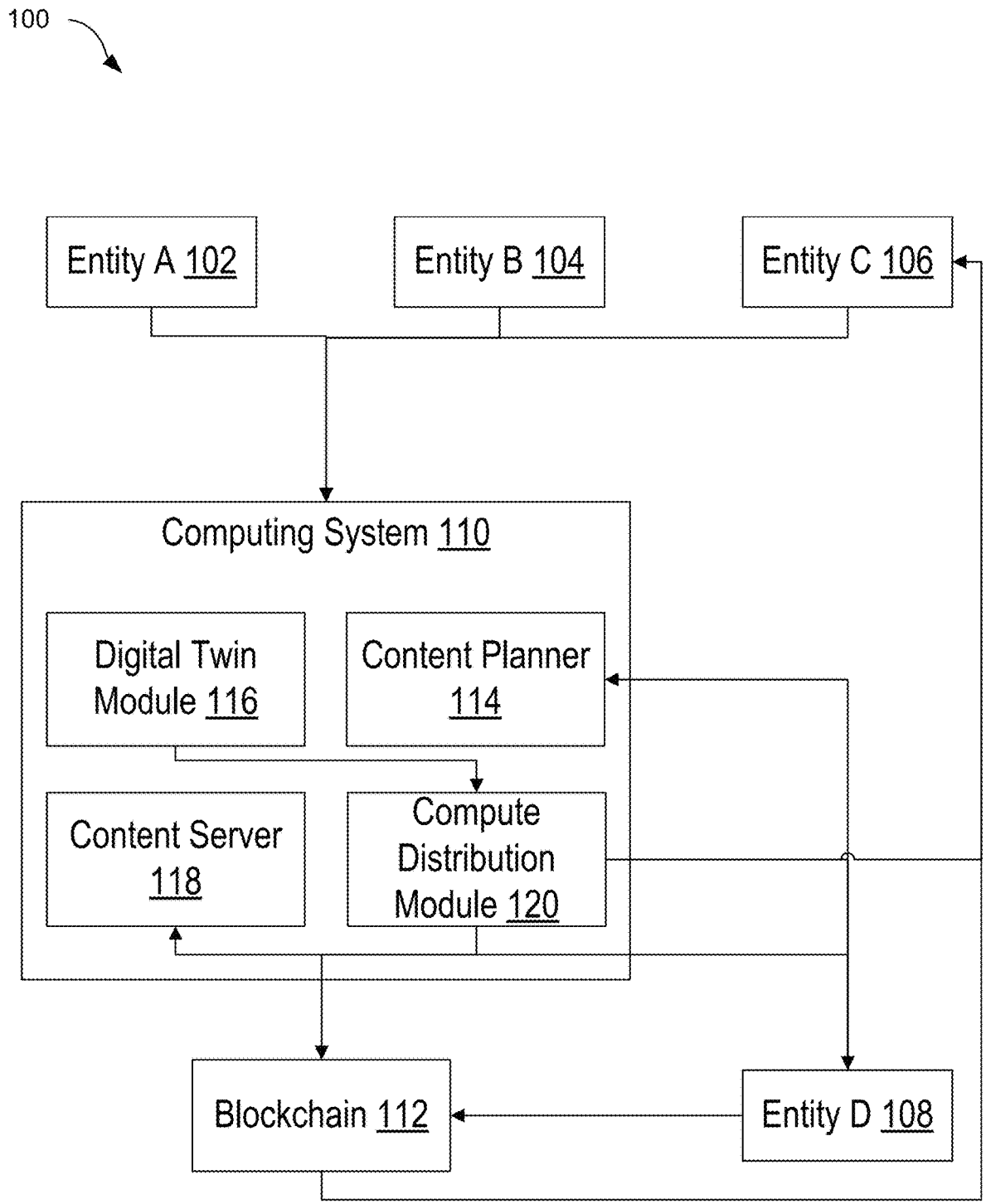
FIG. 1 is a block diagram illustrating an example of a data processing environment for distributing decentralized compute resources according to an embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Overview

Certain aspects and features of the present disclosure relate to distributing and/or managing decentralized compute resources using a digital twin. Decentralized compute resources may include one or more computing devices, computing systems, servers, or other devices that include computer memory, computer processing power, and the like. The one or more computing devices, computing systems, servers, or other devices may be owned, operated, managed, and/or controlled by unrelated entities. An entity may include an individual, such as a user of a computing device, an organization, such as an operator of a computer server, or the like. Entities that are unrelated may make decisions regarding respective compute resources independent of one another. For example, a first entity that is unrelated to a second entity may make a decision about a first compute resource controlled by the first entity without consideration from or with respect to the second entity.

An example of a set of decentralized compute resources can include a first computing device controlled by a first entity (e.g., a first individual), a second computing device controlled by a second entity (e.g., a second individual), and a computer server controlled by a third entity (e.g., an organization) such that the first entity, the second entity, and the third entity may not be related. Each compute resource of the set of decentralized compute resources may have different capacities for computer memory, computer processing power, and the like. For example, the first computing device and the second computing device may have less computer processing power and/or computer memory available than the computer server. Additionally, the first entity, the second entity, and the third entity may independently make available the first computing device, the second computing device, and the computer system, respectively, for distribution.

Distributing compute resources, such as the first computing device, the second computing device, and the computer server, etc., can involve an interaction that allows the respective compute resource to be used by a separate entity that requests the respective compute resource. For example, a fourth entity can request to use compute resources from the first computing device, the second computing device, and/or the computer server, and an interaction between the fourth entity and one or more of the first entity, the second entity, or the third entity can distribute the respective compute resource to allow the fourth entity to use the respective compute resource.

A digital twin can be used to facilitate the interaction or to otherwise facilitate distribution of the decentralized compute resources. In some example, the digital twin can include a digital representation of an existing object, concept, system, or the like. For example, a digital twin can represent components and operation of an aircraft, components and operation of interactions and/or potential interactions between entities, and the like. In a particular example, a digital twin can be generated that represents potential interactions between the fourth entity and one or more of the first entity, the second entity, the third entity or any other entity. The digital twin can be generated based on historical interaction data, compute resource metadata, compute-resource-request metadata, and the like.

In some examples, a digital twin can be a virtual replica of physical entities and/or interactions that can involve a combination of enabling technologies and analytic capabilities. In some examples, a particular organization (e.g., an airline organization) can generate a digital twin of an aircraft such that the digital twin can include data about the plane such as physical data, boarding times, flight times, weather to which the plane was exposed, etc. The digital representation of an aircraft can be used by the particular organization to analyze countless use cases for the aircraft and/or the particular organization. Potential interactions can be similarly modeled with digital twins. Potential interactions may encompass more than the linear movement of compute resources and non-compute resources. The potential interactions may include multiple layers within each potential interaction and with respect to interaction participants. The digital twin can allow providing entities and/or receiving entities to mirror and/or map the complex systems and underlying uncertainties, inform decisions, and adapt to fluctuations associated with the potential interactions. The potential interactions may include distribution of one or more decentralized compute resources. Enhancing and/or optimizing the distribution of decentralized compute resources can be performed using real-time decisions, the digital twin, and the like. The digital twin can be used to contextually classify one or more decentralized compute resources, interaction participants, such as a receiving entity, one or more provider entities, and the like, with respect to different types of potential interactions, and to enhance distribution of decentralized compute resources at scale.

In some examples, an interaction between a receiver entity and a provider entity can be initiated using the digital twin. A computing device can receive compute resource metadata from one or more provider entities, and the computing device can receive a request from a receiver entity to use one or more compute resources. Based on the receiver entity, the provider entities, the compute metadata, potential interactions involving the receiver entity and/or the provider entities, and any other suitable data or metadata, the computing device can generate a digital twin that can represent potential interactions between the provider entities and the receiver entity. In some examples, the digital twin can indicate a particular compute resource of a set of compute resources represented by the compute resource metadata. The particular compute resource may be or include an optimized compute resource that may optimize or otherwise enhance the interaction between the receiver entity and the provider entity. The computing device can initiate an interaction between the receiver entity and a provider entity corresponding to the particular compute resource. In some examples, the interaction can involve allocating the particular compute resource from the provider entity to the receiver entity in response to the request. Allocating the particular compute resource can involve allowing the receiver entity to use the compute resource.

Example of an Environment for Distributing Decentralized Compute Resources

FIG. 1 is a block diagram illustrating an example of a data processing environment 100 for distributing decentralized compute resources according to an embodiment. As illustrated, the data processing environment 100 includes at least entity A 102, entity B 104, entity C 106, entity D 108, a computing system 110, and a blockchain 112, though any additional or alternative components, subcomponents, sub-services, and entities can be included in the data processing environment 100. In some examples, entity A 102, entity B 104, and entity C 106 may each be or include a controller of one or more computing devices, an organization that controls one or more computing devices, or the like. The one or more computing devices may be or include one or more compute resources that are available to be distributed. For example, entity A 102 may control a first set of compute resources, entity B 104 may control a second set of compute resources, and/or entity C 106 may control a third set of compute resources, and entity A 102, entity B 104, and/or entity C 106 may each independently make the respective set of compute resources, or any subset thereof, available for distribution.

Making a compute resource available for distribution may involve generating compute resource metadata, transmitting compute resource metadata, or the like to the computing system 110. For example, entity A 102, entity B 104, and/or entity C 106 may generate compute resource metadata that indicates compute resources available to be distributed and/or transmit the compute resource metadata to the computing system 110. The compute resource metadata can include an address of each available compute resource, a capacity of each available compute resource, an identification information for a provider entity that corresponds to each available compute resource, etc.

For example, entity A 102 may make available for distribution a first compute resource, such as a first computing device with a first computing memory and processing power capacity, and a second compute resource such as a second computing device with a second computing memory and processing power capacity. Other numbers (e.g., less than two or more than two) of compute resources can be made available by entity A 102 and/or any other entity. Entity A 102 can generate or otherwise receive compute resource metadata that has or otherwise indicates (i) a first address for the first compute resource and the first capacity associated with the first compute resource, and (ii) a second address for the second compute resource and the second capacity associated with the second compute resource. Additionally, the compute resource metadata can indicate a controller or controlling entity (e.g., entity A 102) of the first compute resource and the second compute resource. Entity A 102 can transmit the compute resource metadata to the computing system 110 to facilitate an interaction to distribute the available first compute resource and second compute resource. Additionally, entity B 104, entity C 106, and any other entities can generate and/or transmit compute resource metadata to the computing system 110 to facilitate an interaction to distribute available, decentralized compute resources.

The computing system 110 can receive the compute resource metadata from entity A 102, entity B 104, entity C 106, and/or any other entities and can determine, such as by parsing the compute resource metadata or via any other suitable techniques, a set of decentralized compute resources that are available to be distributed. The computing system 110 can include a content planner 114, a digital twin module 116, a content server 118, a compute distribution module 120, and any other modules, services, and the like. Additionally, the computing system 110 can receive one or more requests from entity D 108, which may be a receiving entity such as a user of compute resources, an organization that uses compute resources, and the like. Entity D 108 can generate a request to use compute resources, and entity D 108 can transmit the request to the computing system 110, for example via the content planner 114, the content server 118, and the like. The request can include a timeframe for when entity D 108 is requesting to use compute resources, can include a type and amount of compute resources requested by entity D 108 during the time frame, and the like. In some examples, the request can be transmitted to the computing system 110 and served by the computing system 110 substantially contemporaneously. In other examples, entity D 108 may transmit the request to the computing system 110 in advance of receiving distributed compute resources from the computing system 110.

The computing system 110 can use the digital twin module 116 to generate a digital twin based on entity A 102, entity B 104, entity C 106, entity D 108, an interaction type associated with the entities, compute resource metadata received from the entities, and the like. The interaction type may indicate a use case for the compute resources, a type of entity for entity D 108, or the like. In some examples, the computing system 110 can receive the compute resource metadata, the request, and data about the related entities, and the computing system 110 can execute the digital twin module 116 to generate a digital twin. The digital twin may be generated to represent potential interactions that may take place between entity D 108 and one or more of entity A 102, entity B 104, entity C 106, and/or any other entity that can engage in an interaction with entity D 108. The digital twin may represent potential interactions of a particular interaction type. In one particular example, if entity D 108 is a medical provider requesting to use compute resources for performing remote surgery, the computing system 110 may generate the digital twin to represent potential interactions between the medical provider and provider entities configured to engage in an interaction with the medical provider.

The computing system 110 can use the digital twin to identify, for example via the content server 118 and/or the compute distribution module 120, a particular compute resource among a set of compute resources. The set of compute resources may include compute resources made available for distribution by entity A 102, entity B 104, entity C 106, and any other suitable entity. The particular compute resource may be or include an optimized compute resource that may optimize an interaction between entity D 108 and a provider entity such as one of entity A 102, entity B 104, or entity C 106, etc. The particular compute resource may satisfy parameters of the request transmitted by entity D 108. For example, if the request involves a request for one or more compute resources having at least 16 terabyte hard storage and at least 1 terabyte per second processing power, then the computing system 110 may determine the particular compute resource that has at least 16 terabyte hard storage and at least 1 terabyte per second processing power. In examples in which multiple available compute resources have the same or similar computer memory, processing power, and the like, the computing system 110 may use other parameters to determine the particular compute resource. The other parameters may include a latency associated with the respective compute resource, a physical or virtual location of the compute resource, an amount of non-compute resources associated with the respective compute resource, and the like.

The computing system 110 can initiate, or facilitate initiation of, an interaction between a receiver entity, for example the entity D 108, and a particular provider entity such as one of entity A 102, entity B 104, and/or entity C 106. The particular provider entity may be or include the entity that made available for distribution the particular compute resource identified by the computing system 110. In response to determining the particular compute resource and the particular provider entity, the computing system 110 can initiate or facilitate initiation of the interaction between the receiver entity and the particular provider entity. The interaction can involve the receiver entity, such as entity D 108, providing non-compute resources, such as cryptocurrency, fiat currency, other tangible resources, or the like, via the blockchain 112 or any other suitable computing network that can transfer non-compute resources. In response to the receiver entity providing the non-compute resources, the computing system 110 can cause, for example via the compute distribution module 120, the particular compute resource to transfer from the particular provider entity to the receiver entity. Transferring the particular compute resource may involve the particular provider entity allowing, for example exclusively or at least partially exclusively, the receiver entity to use the particular compute resource. Additionally, the blockchain 112 can provide the non-compute resources to the particular provider entity in response to the computing system 110 causing the particular compute resource to transfer to the receiver entity from the particular provider entity.

Figure 2:
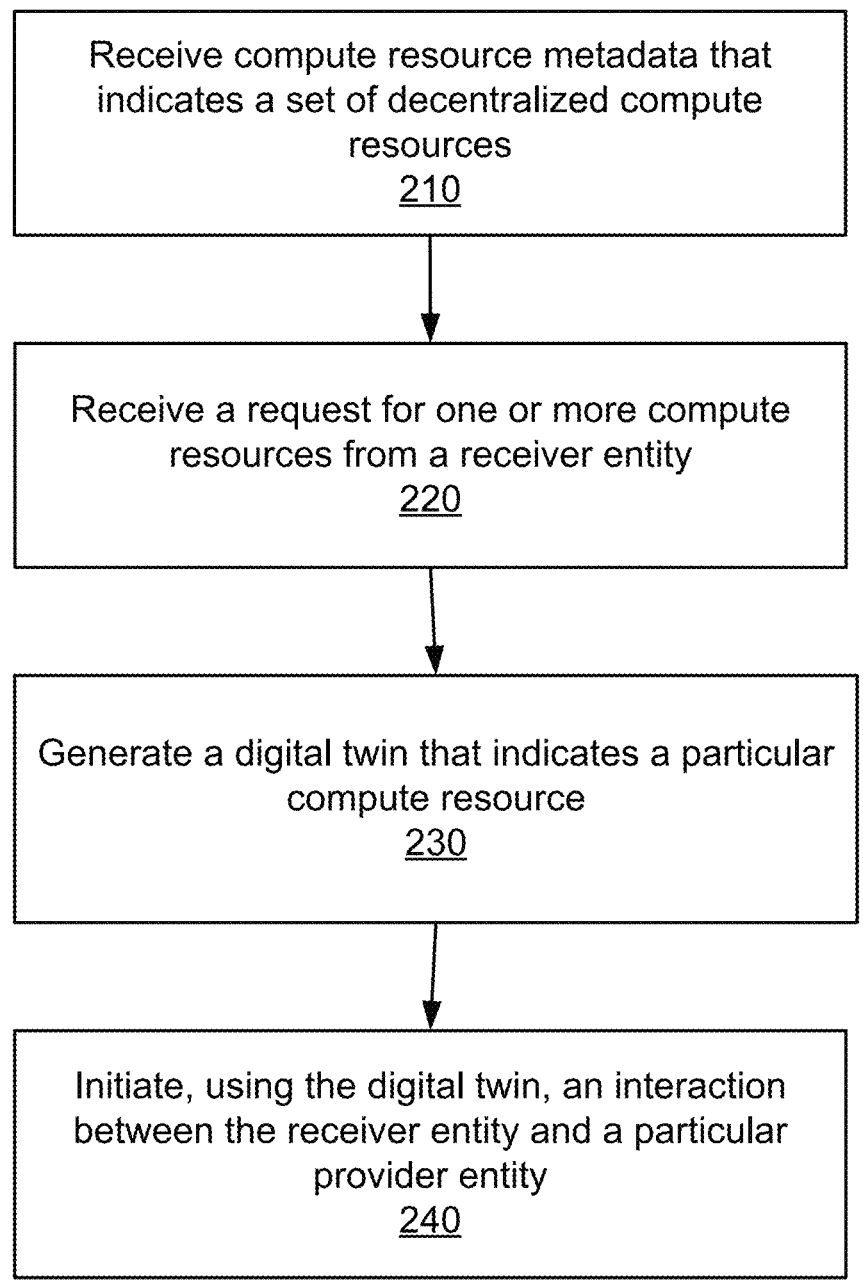
FIG. 2 is a flowchart of a process for using a digital twin for distributing decentralized compute resources according to an embodiment.

Example of a Process for Using a Digital Twin for Distributing Decentralized Compute Resources FIG. 2 is a flowchart of a process 200 for using a digital twin for distributing decentralized compute resources according to an embodiment. The process 200 may be performed at least in part by any of the components described in the figures herein, for example, by any component of the data processing environment 100 or by the data processing environment 100, itself. The process 200 can begin at block 210, when the computing system 110 receives, for example via the content planner 114 or any other component or service of the computing system 110, compute resource metadata from one or more provider entities such as entity A 102, entity B 104, and entity C 106, etc. The compute resource metadata can indicate a set of decentralized compute resources that are available to be distributed. In some examples, the compute resource metadata can include data or metadata indicating an address of each decentralized compute resource in the set of decentralized compute resources, a capacity of each decentralized compute resource in the set of decentralized compute resources, identification information for a provider entity corresponding to each decentralized compute resource in the set of decentralized compute resources, and any other data or metadata about the set of decentralized compute resources.

At block 220, the computing system 110 receives a request from a receiver entity such as entity D 108 or any other entity that can use decentralized compute resources. The receiver entity may generate and transmit the request to the computing system 110, for example via the content planner 114, the content server 118, or any other component or service of the computing system 110, and the request may include a request to use one or more compute resources. In some examples, the request may include parameters for the one or more compute resources, and the parameters may include a minimum computer memory availability, a minimum computer processing power availability, a maximum latency, a particular geographic location or region, and the like. Additionally or alternatively, the request may include a time frame in which the receiver entity is requesting to use or gain access to the one or more compute resources. In some examples, the request may involve the receiver entity requesting compute resources substantially contemporaneously with respect to transmitting the request.

At block 230, the computing system 110 generates a digital twin that can be used to indicate a particular compute resource of the set of decentralized compute resources. The computing system 110 can use the digital twin module 116 to generate the digital twin. The digital twin can be generated based on various data and metadata relating to the receiver entity, potential provider entities that may engage in an interaction with the receiver entity, an interaction type associated with the request transmitted by the receiver entity, and other suitable data or metadata that can be used to generate the digital twin. The computing system 110 can determine a potential interaction type associated with the receiver entity and can generate the digital twin based on the potential interaction type. For example, the computing system 110 may generate a digital twin that is specific to the determined interaction type. Examples of the interaction type may include an interaction for a medical application, an interaction for a military or defense application, an interaction for an entertainment application, and the like. Additionally or alternatively, each potential interaction represented by the digital twin may be characterized by the interaction type.

In some examples, the digital twin may indicate a particular compute resource of the set of decentralized compute resources. The computing system 110 may use the digital twin to identify the particular compute resource, which may be or include an optimized compute resource of the set of decentralized compute resources. The particular compute resource may satisfy the parameters of the request, may involve an optimized, such as a maximum or a minimum, amount of non-compute resources, and the like. In a particular example, the particular compute resource may satisfy the parameters of the request by providing at least the requested bandwidth (e.g., computer memory and computer processing power) and by minimizing the latency associated with using the particular compute resource. In another example, the particular compute resource may be identified by the computing system 110 in response to determining that the particular compute resource satisfies the parameters of the request and is associated with the smallest amount of non-compute resources for initiating an interaction to use the particular compute resource.

At block 240, the computing system 110 initiates an interaction between a particular provider entity associated with the particular compute resource and the receiver entity using the digital twin. The computing system 110, for example via the compute distribution module 120 and based on identifying the particular compute resource, can initiate the interaction between the receiver entity and the particular provider entity to allocate the particular compute resource to the receiver entity from the particular provider entity. Allocating the particular compute resource may involve allowing the receiver entity to use the particular compute resource. In some examples, allocating the particular compute resource to the receiver entity may involve generating a unique key that can be used to gain access to and use the particular compute resource. In this example, the computing system 110 can provide (e.g., transmit) the unique key to the receiver entity to allow the receiver entity to use the particular compute resource.

In some examples, the interaction can involve a transfer of non-compute resources via a computing network separate from the computing system 110. The computing network may be or include a blockchain, such as the blockchain 112, to enhance a security of the interaction, though computing networks other than blockchains are also possible to be used. In a particular example, the receiver entity, upon the computing system 110 initiating the interaction or facilitating initiation of the interaction, can transmit a predetermined amount of non-compute resources to the blockchain, and the computing system 110 can provide the particular compute resource for the receiver entity to use. Additionally, the particular provider entity, for example upon providing the particular compute resource to the receiver entity, can receive the non-compute resources from the blockchain.

Figure 3:
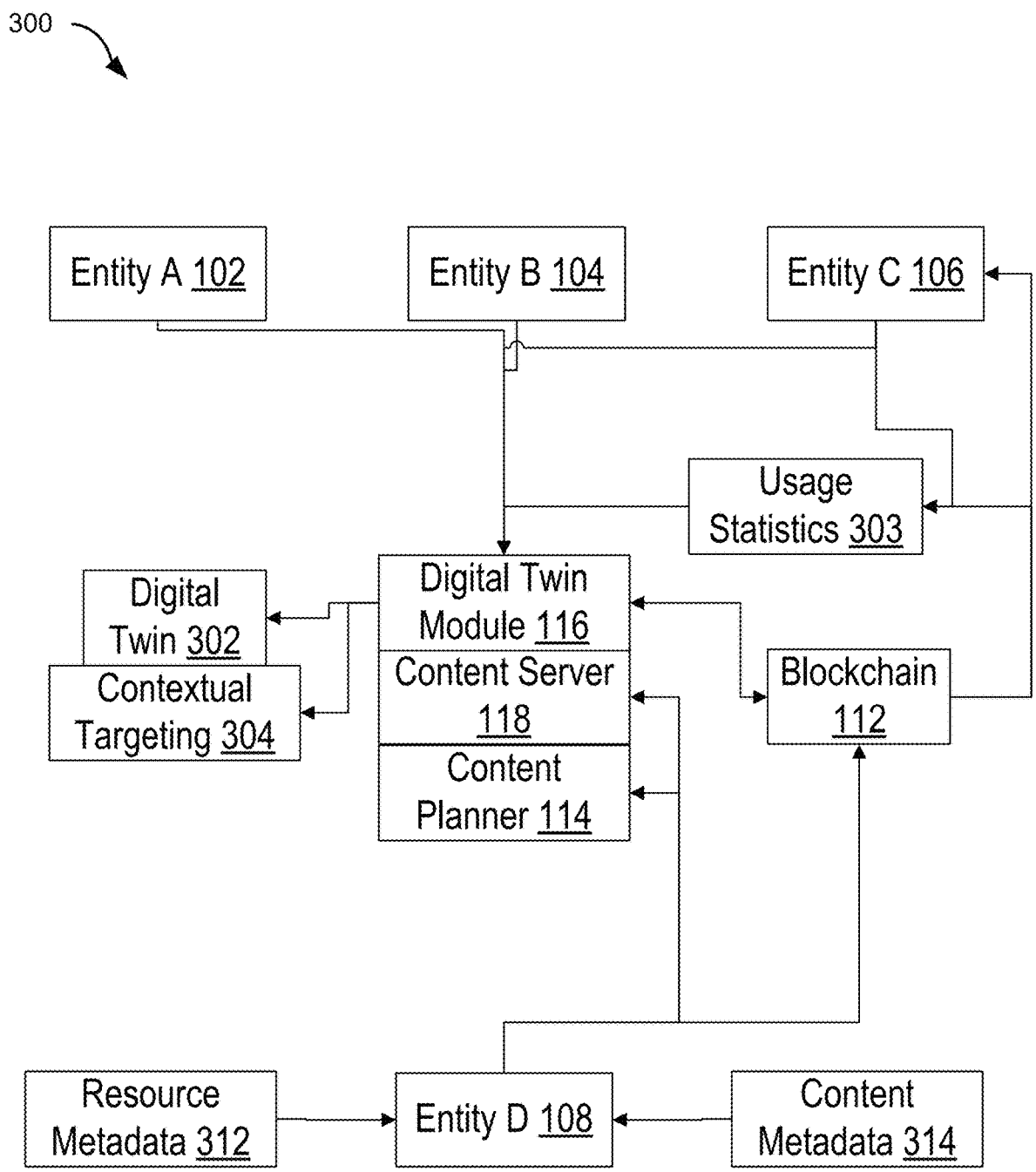
FIG. 3 is an example of a data flow diagram for using a digital twin for distributing decentralized compute resources according to an embodiment.

Examples of Data Flow for Using a Digital Twin for Distributing Decentralized Compute Resources FIG. 3 is an example of a data flow diagram 300 for using a digital twin 302 for distributing decentralized compute resources according to an embodiment. As illustrated, the data flow diagram 300 may include entity A 102, entity B 104, entity C 106, entity D 108, the blockchain 112, one or more components or services of the computing system 110, and any other computing device, program encoded thereon, services, and the like to facilitate distribution of decentralized compute resources. Provider entities, such as entity A 102, entity B 104, entity C 106, and the like can make available a set of decentralized compute resources and can generate and/or transmit compute resource metadata to the digital twin module 116. The compute resource metadata can indicate the set of decentralized compute resources that are available to be distributed as well as indicate a capacity, location, controlling entity, and the like of respective compute resources included in the set of decentralized compute resources.

The digital twin module 116 can receive the compute resource metadata, and the digital twin module 116 may communicate with the content planner 114, the content server 118, and/or any other component, service, and the like of the computing system 110. For example, the digital twin module 116 can receive data about a request received by the content planner 114 from entity D 108 or any other receiver entity. The request may indicate that the receiver entity is requesting to use one or more compute resources during a predetermined time frame, which may be immediately following the request or at a future time. The request may additionally include data and metadata about the receiver entity, and the data and metadata may include a type of entity of the receiver entity, a type of request, a type and amount of compute resources requested, and the like. In some examples, the request can include resource metadata 312 and content metadata 314, which may indicate a requested type and amount of compute resources, and a potential interaction type, respectively, requested by the receiver entity.

The digital twin module 116 can use the request, the compute resource metadata, and other data and/or metadata to generate the digital twin 302. For example, the digital twin module 116 can use data characterizing the receiver entity, data characterizing one or more of the provider entities associated with the compute resource metadata, data about potential interactions between the receiver entity and one or more of the provider entities, data about a type of entity or a type of interaction associated with the receiver entity, data about non-compute resources to be used to facilitate one or more potential interactions between the receiver entity and one or more of the provider entities, and the like to generate the digital twin. Additionally, the digital twin module 116 can use usage statistics 303, which may indicate how much use a computing network (e.g., the blockchain 112) is encountering or is expected to encounter during a predetermined time period, etc., to generate the digital twin 302. The digital twin module 116 can generate the digital twin 302 based on a potential interaction type between the receiver entity and one or more of the provider entities. In a particular example, if the digital twin module 116 determines that the potential interaction type involves distributing decentralized compute resources for a military or defense application, then the digital twin module 116 can generate the digital twin 302 to represent one or more potential interactions involving a military or defense application between the receiver entity and one or more of the provider entities.

Additionally or alternatively, the digital twin module 116 can leverage contextual targeting 304 to generate the digital twin 302 or to otherwise facilitate an interaction based on the request from the receiver entity. For example, the digital twin module 116 may receive measurement reports, performance reports, and the like for interactions involving the receiver entity and/or the one or more provider entities across multiple platforms, multiple interaction types, or the like. In some examples, the digital twin module 116 may use techniques related to cross-platform contextual targeting described in U.S. application Ser. No. 18/158,221.

The digital twin 302 can be used to initiate an interaction, or to facilitate initiation of an interaction, between the receiver entity and a particular provider entity of the one or more provider entities. For example, the digital twin 302 can indicate a particular compute resource associated with the particular provider entity. Indicating the particular compute resource can involve allowing the content server 118, or other component or service of the computing system 110 to use the digital twin 302 to determine the particular compute resource. In some examples, the content server 118, or in some cases the compute distribution module 120, can identify the particular compute resource using the digital twin 302 or any potential interaction represented therein. The particular compute resource may satisfy parameters defined by the request from the receiver entity and may otherwise optimize or enhance the interaction between the receiver entity and the particular provider entity. Optimizing the interaction may involve minimizing a latency associated with the receiver entity using the particular compute resource, maximizing a bandwidth made available for the receiver entity using the particular compute resource, minimizing an amount of non-compute resources associated with the interaction, or other indications of optimization.

The content server 118 may select the particular compute resource and transmit the particular compute resource to the receiver entity, for example in response to the receiver entity transmitting a predetermined amount of non-compute resources via the blockchain 112 or other suitable computing network. In some examples, the predetermined amount of non-compute resources can be determined by (or by using) the digital twin 302, and entity D 108, or any other receiver entity, can transmit the predetermined non-compute resources to the blockchain 112 to initiate or continue the interaction. Additionally, in response to the receiver entity transmitting the predetermined amount of non-compute resources via the blockchain 112, or in response to receiving an indication that the receiver entity agrees to engage in the interaction, the content server 118 may transmit the particular compute resource from the particular provider entity to the receiver entity. In some examples, transmitting the particular compute resource may involve allowing the receiver entity to access, for example remotely, the particular compute resource. In a particular example, the content server 118, or in some cases the compute distribution module 120, can generate a unique access key, which can be used to access the particular compute resource, and can transmit the unique access key to the receiver entity.

Figure 4:
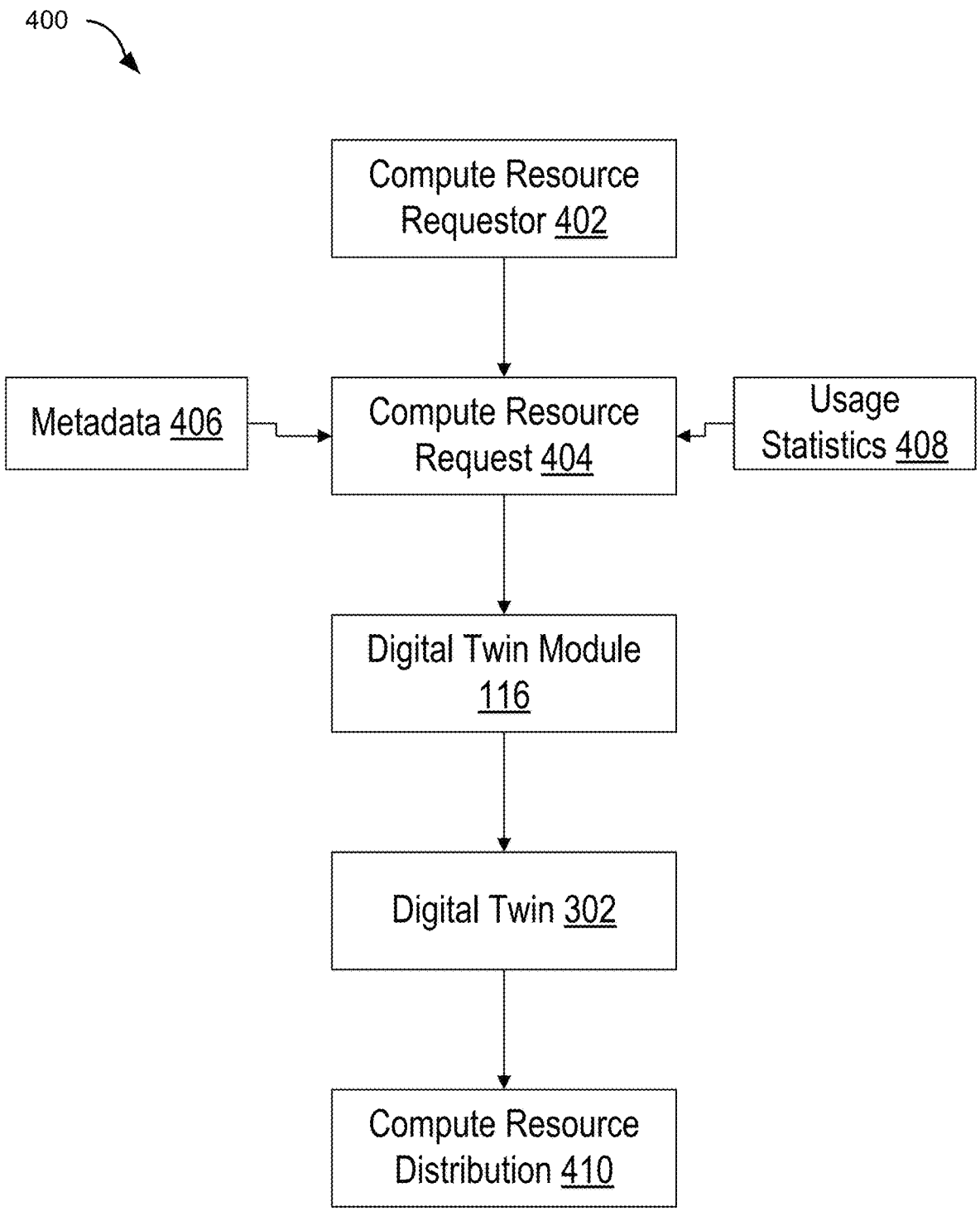
FIG. 4 is another example of a data flow diagram for using a digital twin for distributing decentralized compute resources according to an embodiment.

FIG. 4 is another example of a data flow diagram 400 for using a digital twin 302 for distributing decentralized compute resources according to an embodiment. As illustrated, the data flow diagram 400 may involve receiving a request to access one or more decentralized compute resources. The request may be received via compute resource requestor 402, which may be or include a module or service provided by the computing system 110. For example, the computing system 110 may generate and provide a user interface including the compute resource requestor 402 to a receiving entity that can interact with the user interface to generate and transmit a request to the computing system 110. The receiving entity can use the compute resource requestor 402 to generate and transmit a request for using one or more compute resources.

The receiving entity can generate the request via the compute resource requestor 402 by generating and/or transmitting resource metadata (e.g., the resource metadata 312) and/or content metadata (e.g., the content metadata 314) via the compute resource requestor 402. The resource metadata and/or the content metadata may indicate a type and an amount of compute resources requested to be used by the receiving entity, may indicate a type and/or number of interactions requested to be initiated by the receiver entity, and the like. In response to generating and/or transmitting the content metadata and/or the resource metadata, for example to the computing system 110, a compute resource request 404 can be generated that indicates the type and the amount of compute resources requested to be used by the receiving entity, the type and/or the number of interactions requested to be initiated by the receiver entity, and the like.

The computing system 110, or any component, module, or service thereof, can receive the compute resource request 404 and can augment the compute resource request 404 with metadata 406, usage statistics 408, and any other data that can be used to generate the digital twin 302. The metadata 406 may include indications such as amounts or ranges of non-compute resources for initiating one or more potential interactions between one or more of the provider entities, may include an amount of non-compute resources or a range of non-compute resources for the receiver entity to engage in the interaction, an amount of compute resources available to be distributed, an amount of compute resources requested to be used, and the like. The usage statistics 408 may include indications such as an indication of a load on a computing network (e.g., the blockchain 112) at the present or an expected load on the computing network at a future time or time range, or such as a load on the computing system 110, and the like. The compute resource request 404, along with the metadata 406 and the usage statistics 408 can be transmitted to the digital twin module 116.

The digital twin module 116 can receive the compute resource request 404, the metadata 406, the usage statistics 408, and any other data and/or metadata that can be used to generate the digital twin 302. The digital twin module 116 can use the compute resource request 404, the metadata 406, and/or the usage statistics 408 to generate the digital twin 302, which may be or include a representation of one or more potential interactions between the receiver entity and one or more provider entities. In some examples, the digital twin 302 can represent one or more potential interactions characterized by a common interaction type. The interaction type may indicate a use-case, an application, or other classification associated with a respective potential interaction. For example, classifications of the interaction type may include a medical application, a military or defense application, an entertainment application, and the like.

In some examples, the digital twin 302 may be or include a data object, which may include computer-executable code, stored data, and the like. Some examples of the stored data associated with the digital twin 302 can include an interaction type associated with the request, a CPU load request, a GPU load request, a maximum amount of non-compute resources associated with other interactions characterized by the interaction type, a minimum amount of non-compute resources associated with other interactions characterized by the interaction type, the interaction requested, data and/or metadata (e.g., a requested time frame, entities associated with the interaction, and the like) about the requested interaction. Additional examples of the stored data associated with the digital twin 302 can include a type of non-compute resource offered or used by the receiver entity, the time frame associated with the compute resource request 404, a minimum or maximum amount of non-compute resources offered or used by the receiver entity for initiating the interaction, a type of non-compute resource accepted by or used by one or more (or each) of the provider entities, a minimum or maximum amount of non-compute resources accepted by or used by one or more (or each) of the provider entities for initiating the interaction, a location of one or more (or each) of the provider entities, and the like.

Additionally, the digital twin module 116 or the digital twin 302 can include computer-executable code for managing the digital twin 302, generating the digital twin 302, maintaining the digital twin 302, adjusting the digital twin 302, and the like. For example, the digital twin module 116 can include computer-executable instructions to define or generate the data object that is or includes the digital twin 302. The digital twin module 116 can execute the computer-executable instructions to define or generate the data object in response to receiving the compute resource request 404, or the like. In some examples, the digital twin module 116 can include a first set of computer-executable instructions to define the data object and a second set of computer-executable instructions to generate the digital twin 302 based on the compute resource request 404, the metadata 406, the usage statistics 408, and any other data using the data object. The digital twin module 116 and/or the digital twin 302 may include computer-executable instructions to (i) store the digital twin 302 in a particular storage location, database, or the like, (ii) to retrieve, for example at a later time, the digital twin 302, (iii) to adjust the digital twin 302 in response to receiving an updated compute resource request, updated metadata, or the like, etc.

In some examples, the digital twin 302 may be previously generated and/or existing at the time the compute resource request 404 is transmitted. In these examples, the digital twin module 116 can, in response to receiving the compute resource request 404, retrieve the existing digital twin and adjust the existing digital twin to generate the digital twin 302. The digital twin module 116 may generate and/or submit a query, a nested query, or the like with respect to a data store to retrieve the existing digital twin. Adjusting the existing digital twin may involve updating the stored data in the existing digital twin based on the compute resource request 404, the metadata 406, and/or the usage statistics 408. The digital twin module 116 can otherwise adjust the existing digital twin to generate the digital twin 302.

In response to generating the digital twin 302, adjusting the digital twin 302, and the like, the computing system 110 can use the digital twin 302 to identify the particular compute resource and initiate the interaction between the receiver entity and the particular provider entity corresponding to the particular compute resource. In some examples, the interaction may involve identifying more than one particular compute resource and initiating the interaction between more than one particular provider entity corresponding to the more than one particular compute resource. The interaction may be initiated via compute resource distribution 410, which may involve the computing system 110 executing, for example, the compute distribution module 120. The compute resource distribution 410 may allocate the particular compute resource to the receiver entity in response to initiating the interaction and/or facilitating initiation of the interaction.

The compute resource distribution 410 may allocate the particular compute resource to the receiver entity from the particular provider entity. For example, the compute resource distribution 410 may provide to the receiver entity secure access (e.g., via a unique key, access via a virtual network, etc.) to the particular compute resource. In some examples, the secure access provided to the receiver entity may be time-limited for example to the requested time frame indicated by the compute resource request 404. Subsequent to the time frame expiring, the secure access to the particular compute resource may be revoked by the compute resource distribution 410, and, to continue accessing the particular compute resource, the receiver entity may be prompted to submit a subsequent compute resource request with updated parameters.

Illustrative Systems

Figure 5:
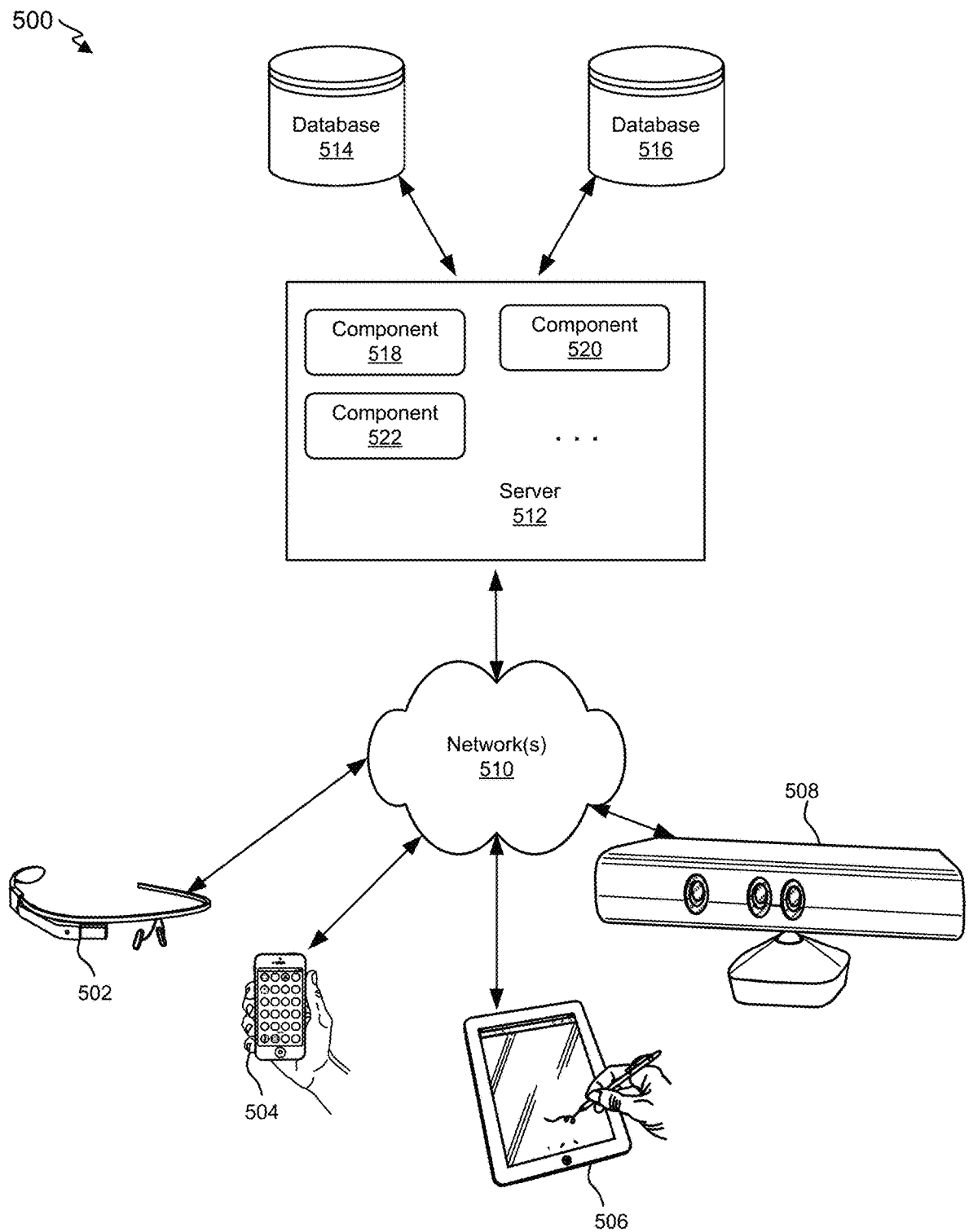
FIG. 5 is a simplified diagram illustrating a distributed system for implementing one of the embodiments.

FIG. 5 depicts a simplified diagram of a distributed system 500 for implementing one of the embodiments. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network(s) 510.

In various embodiments, server 512 may be adapted to run one or more services or software applications provided by one or more of the components of the system. In some embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in the figure, the software components 518, 520 and 522 of distributed system 500 are shown as being implemented on server 512. In other embodiments, one or more of the components of distributed system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in the figure is thus one example of a distributed system for implementing an embodiment system and is not intended to be limiting.

Client computing devices 502, 504, 506, and/or 508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. In some embodiments, the client computing devices can be special purpose computers that may be programmed or otherwise designed to perform a defined function via an embedded system, or the like, to perform the defined function independent of other tasks. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although distributed system 500 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), such as one based on Ethernet, Token-Ring and/or the like. Network(s) 510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 512 may be composed of one or more general purpose computers, special purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 512 may be adapted to run one or more services or software applications described in the foregoing disclosure. For example, server 512 may correspond to a server for performing processing described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Examples of database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508. Distributed system 500 may also include one or more databases 514 and 516.

Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely. In one set of embodiments, databases 514 and 516 may include relational databases, such as databases provided by Oracle, that are adapted to store, update, and retrieve data in response to SQL-formatted commands.

Figure 6:
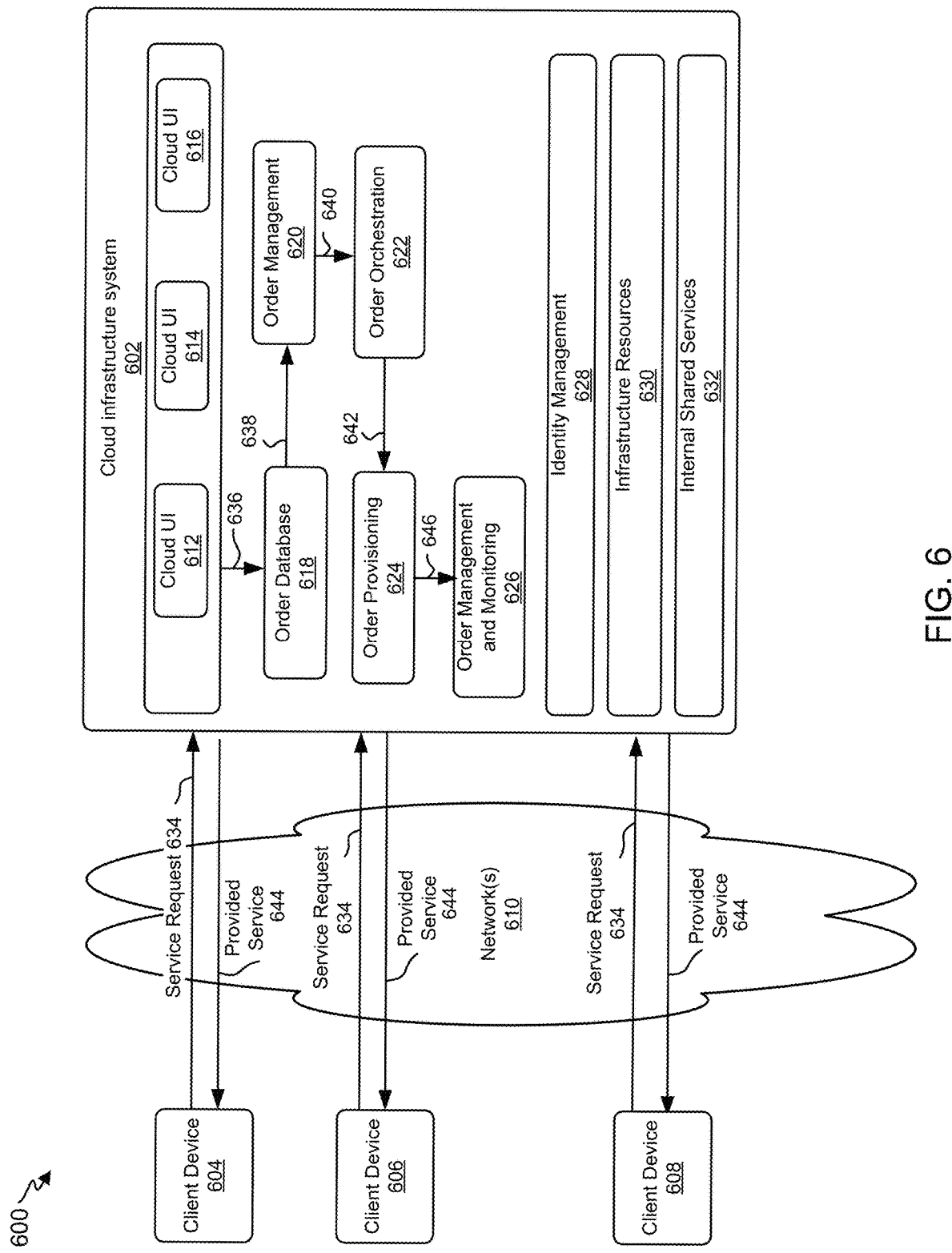
FIG. 6 is a simplified block diagram illustrating one or more components of a system environment according to an embodiment.

FIG. 6 is a simplified block diagram of one or more components of a system environment 600 by which services provided by one or more components of an embodiment system may be offered as cloud services, in accordance with an embodiment of the present disclosure. In the illustrated embodiment, system environment 600 includes one or more client computing devices 604, 606, and 608 that may be used by users to interact with a cloud infrastructure system 602 that provides cloud services. The client computing devices may be configured to operate a client application such as a web browser, a proprietary client application (e.g., Oracle Forms), or some other application, which may be used by a user of the client computing device to interact with cloud infrastructure system 602 to use services provided by cloud infrastructure system 602.

It should be appreciated that cloud infrastructure system 602 depicted in the figure may have other components than those depicted. Further, the embodiment shown in the figure is only one example of a cloud infrastructure system that may incorporate an embodiment of the invention. In some other embodiments, cloud infrastructure system 602 may have more or fewer components than shown in the figure, may combine two or more components, or may have a different configuration or arrangement of components.

Client computing devices 604, 606, and 608 may be devices similar to those described above for 502, 504, 506, and 508.

Although system environment 600 is shown with three client computing devices, any number of client computing devices may be supported. Other devices such as devices with sensors, etc. may interact with cloud infrastructure system 602.

Network(s) 610 may facilitate communications and exchange of data between clients 604, 606, and 608 and cloud infrastructure system 602. Each network may be any type of network familiar to those skilled in the art that can support data communications using any of a variety of commercially-available protocols, including those described above for network(s) 610.

Cloud infrastructure system 602 may comprise one or more computers and/or servers that may include those described above for server 512.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can be scaled based on the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 602 may include a suite of applications, middleware, and database service offerings that are delivered to a customer in a self-service, subscription-based, reliable, highly available, and secure manner. The database service offerings may involve computing/storage resources being provisioned and configured for specialized use as needed, and the resources being un-provisioned in scenarios where the resources are not needed or not expected to be needed within a timeframe. An example of such a cloud infrastructure system is the Oracle Public Cloud provided by the present assignee.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In some embodiments, the services provided by cloud infrastructure system 602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and customizable services that can authenticate users and adapt to diverse needs of diverse organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to customers of the cloud infrastructure system. In one embodiment, infrastructure resources 630 may include pre-integrated and optimized combinations of hardware, such as servers, storage, and networking resources to execute the services provided by the PaaS platform and the SaaS platform.

In some embodiments, resources in cloud infrastructure system 602 may be shared by multiple users, and the resources can be re-allocated based on demand. Additionally, resources may be allocated to users in different time zones. For example, cloud infrastructure system 630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 and by the services provided by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like.

In one embodiment, as depicted in the figure, cloud management functionality may be provided by one or more modules, such as an order management module 620, an order orchestration module 622, an order provisioning module 624, an order management and monitoring module 626, and an identity management module 628. These modules may include or be provided using one or more computers and/or servers, which may be general purpose computers, special purpose computers, specialized server computers, server farms, server clusters, or any other appropriate arrangement and/or combination.

In operation 634, a customer using a client device, such as client device 604, 606 or 608, may interact with cloud infrastructure system 602 by requesting one or more services provided by cloud infrastructure system 602 and placing an order for a subscription for one or more services offered by cloud infrastructure system 602. In certain embodiments, the customer may access a cloud User Interface (UI), cloud UI 612, cloud UI 614 and/or cloud UI 616 and place a subscription order via these UIs. The order information received by cloud infrastructure system 602 in response to the customer placing an order may include information identifying the customer and one or more services offered by the cloud infrastructure system 602 that the customer intends to subscribe to.

After an order has been placed by the customer, the order information is received via the cloud UIs, 612, 614 and/or 616.

At operation 636, the order is stored in order database 618. Order database 618 can be one of several databases operated by cloud infrastructure system 618 and operated in conjunction with other system elements.

At operation 638, the order information is forwarded to an order management module 620. In some instances, order management module 620 may be configured to perform billing and accounting functions related to the order, such as verifying the order, and upon verification, booking the order.

At operation 640, information regarding the order is communicated to an order orchestration module 622. Order orchestration module 622 may utilize the order information to orchestrate the provisioning of services and resources for the order placed by the customer. In some instances, order orchestration module 622 may orchestrate the provisioning of resources to support the subscribed services using the services of order provisioning module 624.

In certain embodiments, order orchestration module 622 enables the management of processes associated with each order and applies logic to determine whether an order should proceed to provisioning. At operation 642, upon receiving an order for a new subscription, order orchestration module 622 sends a request to order provisioning module 624 to allocate resources and configure those resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. Order orchestration module 622 may thus be isolated from implementation details, such as whether or not services and resources are actually provisioned on the fly or pre-provisioned and only allocated/assigned upon request.

At operation 644, once the services and resources are provisioned, a notification of the provided service may be sent to customers on client devices 604, 606 and/or 608 by order provisioning module 624 of cloud infrastructure system 602.

At operation 646, the customer's subscription order may be managed and tracked by an order management and monitoring module 626. In some instances, order management and monitoring module 626 may be configured to collect usage statistics for the services in the subscription order, such as the amount of storage used, the amount data transferred, the number of users, and the amount of system up time and system down time.

In certain embodiments, cloud infrastructure system 600 may include an identity management module 628. Identity management module 628 may be configured to provide identity services, such as access management and authorization services in cloud infrastructure system 600. In some embodiments, identity management module 628 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.) Identity management module 628 may also include the management of descriptive information about each customer and about how and by whom that descriptive information can be accessed and modified.

Figure 7:
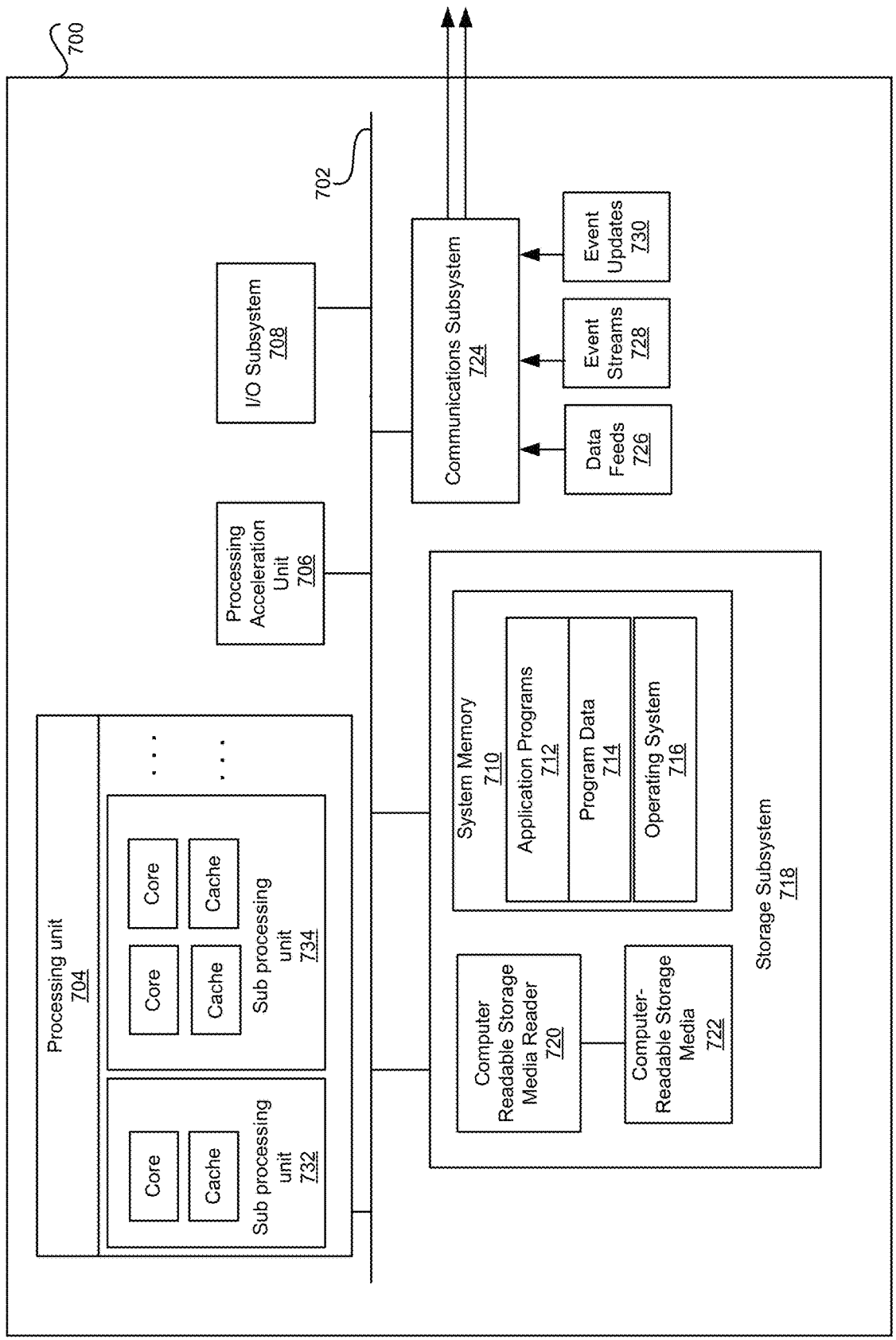
FIG. 7 illustrates an exemplary computer system, in which various embodiments of the present invention may be implemented.

FIG. 7 illustrates an example of a computer system 700, in which various embodiments of the present invention may be implemented. The system 700 may be used to implement any of the computer systems described above. As shown in the figure, computer system 700 includes a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present invention.

Storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Non-Limiting Examples of Techniques Described Herein

In some examples, the digital twin 302 can be generated with respect to an auction. For example, the receiver entity may indicate a range of non-compute resources (e.g., cryptocurrency, and the like) that the receiver entity is willing to transmit for initiating an interaction to use one or more decentralized compute resources. Additionally, each provider entity of a set of provider entities can indicate, for example via the compute resource metadata, a range of non-compute resources that the respective provider entity is willing to accept for the respective compute resource. The computing system 110 can determine a subset of the available decentralized compute resources that satisfy the parameters of the request submitted by the receiver entity, and the computing system 110 can, for example via digital twin module 116, the content server 118, the compute distribution module 120, or any combination thereof, determine the optimized interaction to initiate based on the range of non-compute resources indicated by the receiver entity and by the set of provider entities.

In some examples, the digital twin 302 can be generated and used to initiate an interaction with respect to one or more medical applications such as a medical provider visit, surgery, and the like. A virtual reality application can allow doctor visits with world class medical providers to be fully immersive but not require the medical providers to be physically present in rural areas. A virtual reality environment can be used for availability anywhere in the world where a patient could get an annual check-up or see a brain cancer specialist in hard-to-reach locations. The virtual reality application may require low network latency and a large amount of compute processing power to take blood or get results back. Additionally or alternatively, an augmented reality application may enable world-class surgeons to perform complex surgeries remotely on patients. In this example, the augmented reality application may have very high bandwidth, compute processing power, and very low latency. The virtual reality application and the augment reality application for medical interactions may use more compute resources than locally available or than provided by an organization associated with the medical provider or surgeon. The medical provider, the surgeon, the organization, or a combination thereof can generate and/or transmit a compute resource request to gain access to decentralized compute resources to use to enable the virtual reality application, the augmented reality application, and the like.

In some examples, for defense and/or military use-cases, being able to pool massive amounts of compute resources at extremely low latencies can be beneficial in various implementations such as artificial intelligence, future state virtual and augmented reality, and the like. An artificial intelligence application with low latency can be used in various defense and/or military use-cases. In a particular example, an augmented reality application can be used by a soldier to have real-time applications running within glasses that can be worn by the soldier and that can simulate movement in a field of battle predicting outcomes. Locally available compute resources may be limited or scarce. For example, computing devices embedded in wearable technology may not provide enough computer processing power, computer memory, or the like to effectively execute artificial intelligence applications, augmented reality applications, or the like. The soldier, or an organization associated with the soldier may generate and/or transmit a compute resource request to access one or more decentralized compute resources to facilitate effective execution of the artificial intelligence applications, the augmented reality applications, and the like.

In some examples, education can be enhanced by artificial intelligence applications, augmented reality or virtual reality applications, or the like. For example, teachers may teach more students faster in an immersive, classroom environment. A combination of augmented and virtual reality applications to enable the enhancement to education may be characterized by higher bandwidth at scale and low latency on-demand features. The immersive, classroom environment can be extended to geographic locations in which the cost of teachers is prohibitive to enable a world-class. The teacher, or any organization associated with the teach, may generate and/or transmit a compute resource request to access one or more decentralized compute resources to facilitate the immersive, classroom environment.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
    receiving, by a computing device, compute resource metadata that identifies decentralized compute resources associated with provider entities;
    receiving, by the computing device and from a receiver entity, a request to use one or more compute resources, wherein the request is associated with a particular interaction type of a plurality of interaction types, a particular time frame, and one or more parameters to support the particular interaction type;
    generating, by the computing device and based on the request, a digital twin specific to the particular interaction type, the particular time frame, and the one or more parameters, wherein the digital twin comprises a data object having stored data generated based at least on the request and the compute resource metadata, the digital twin facilitating identification of a particular compute resource of the decentralized compute resources; and
    initiating, by the computing device and by using the digital twin, an interaction between the receiver entity and a particular provider entity of the provider entities, wherein initiating the interaction comprises:
        determining, by the computing device and by using the digital twin, an amount of non-computing resources to be transferred prior to initiating the interaction; and
        allocating, by the computing device, the particular compute resource from the particular provider entity to the receiver entity after the transfer of the amount of non-computing resources;
        wherein allocating the particular compute resource passes control of interactions of the particular interaction type to the receiver entity;
    subsequent to the particular time frame, revoking access of the receiver entity to the particular compute resource.

2. The computer-implemented method of claim 1, wherein the one or more parameters comprise a minimum amount of memory availability, wherein the digital twin is specific to the minimum amount of memory, and wherein the particular compute resource is configured to support the particular interaction type with the minimum amount of memory available.

3. The computer-implemented method of claim 1, wherein the one or more parameters comprise a minimum processing power availability, wherein the digital twin is specific to the minimum processing power, and wherein the particular compute resource is configured to support the particular interaction type with the minimum processing power available.

4. The computer-implemented method of claim 1, wherein the one or more parameters comprise a maximum latency, wherein the digital twin is specific to the maximum latency, and wherein the particular compute resource is configured to support the particular interaction type within the maximum latency.

5. The computer-implemented method of claim 1, wherein the one or more parameters are based on a particular geographic location, wherein the digital twin is specific to the particular geographic location, and wherein the particular compute resource is configured to support the particular interaction type within the particular geographic location.

6. The computer-implemented method of claim 1, wherein the compute resource metadata comprises a minimum amount of non-computing resources accepted by the particular provider entity, and wherein the request offers at least the minimum amount of non-computing resources by the receiver entity.

7. The computer-implemented method of claim 1, wherein the particular interaction type is a medical interaction, and wherein the particular compute resource comprises computer resources approved for the medical interaction.

8. A non-transitory machine-readable storage medium comprising a computer program product that includes instructions configured to cause a data processing apparatus to perform operations comprising:
   receiving, by a computing device, compute resource metadata that identifies decentralized compute resources associated with provider entities;
   receiving, by the computing device and from a receiver entity, a request to use one or more compute resources, wherein the request is associated with a particular interaction type of a plurality of interaction types, a particular time frame, and one or more parameters to support the particular interaction type;
   generating, by the computing device and based on the request, a digital twin specific to the particular interaction type, the particular time frame, and the one or more parameters, wherein the digital twin comprises a data object having stored data generated based at least on the request and the compute resource metadata, the digital twin facilitating identification of a particular compute resource of the decentralized compute resources; and
   initiating, by the computing device and by using the digital twin, an interaction between the receiver entity and a particular provider entity of the provider entities, wherein initiating the interaction comprises:
      determining, by the computing device and by using the digital twin, an amount of non-computing resources to be transferred prior to initiating the interaction; and
      allocating, by the computing device, the particular compute resource from the particular provider entity to the receiver entity after the transfer of the amount of non-computing resources;
      wherein allocating the particular compute resource passes control of interactions of the particular interaction type to the receiver entity;
   subsequent to the particular time frame, revoking access of the receiver entity to the particular compute resource.

9. The non-transitory machine-readable storage medium of claim 8, wherein the one or more parameters comprise a minimum amount of memory availability, wherein the digital twin is specific to the minimum amount of memory, and wherein the particular compute resource is configured to support the particular interaction type with the minimum amount of memory available.

10. The non-transitory machine-readable storage medium of claim 8, wherein the one or more parameters comprise a minimum processing power availability, wherein the digital twin is specific to the minimum processing power, and wherein the particular compute resource is configured to support the particular interaction type with the minimum processing power available.

11. The non-transitory machine-readable storage medium of claim 8, wherein the one or more parameters comprise a maximum latency, wherein the digital twin is specific to the maximum latency, and wherein the particular compute resource is configured to support the particular interaction type within the maximum latency.

12. The non-transitory machine-readable storage medium of claim 8, wherein the one or more parameters are based on a particular geographic location, wherein the digital twin is specific to the particular geographic location, and wherein the particular compute resource is configured to support the particular interaction type within the particular geographic location.

13. The non-transitory machine-readable storage medium of claim 8, wherein the compute resource metadata comprises a minimum amount of non-computing resources accepted by the particular provider entity, and wherein the request offers at least the minimum amount of non-computing resources by the receiver entity.

14. The non-transitory machine-readable storage medium of claim 8, wherein the particular interaction type is a medical interaction, and wherein the particular compute resource comprises computer resources approved for the medical interaction.

15. A system comprising:
   one or more data processors; and
   a non-transitory computer-readable storage medium containing instructions which, when executed on the one or more data processors, cause the one or more data processors to perform operations comprising:
      receiving, by a computing device, compute resource metadata that identifies decentralized compute resources associated with provider entities;
      receiving, by the computing device and from a receiver entity, a request to use one or more compute resources, wherein the request is associated with a particular interaction type of a plurality of interaction types, a particular time frame, and one or more parameters to support the particular interaction type;
      generating, by the computing device and based on the request, a digital twin specific to the particular interaction type, the particular time frame, and the one or more parameters, wherein the digital twin comprises a data object having stored data generated based at least on the request and the compute resource metadata, the digital twin facilitating identification of a particular compute resource of the decentralized compute resources; and initiating, by the computing device and by using the digital twin, an interaction between the receiver entity and a particular provider entity of the provider entities, wherein initiating the interaction comprises:

determining, by the computing device and by using the digital twin, an amount of non-computing resources to be transferred prior to initiating the interaction; and allocating, by the computing device, the particular compute resource from the particular provider entity to the receiver entity after the transfer of the amount of non-computing resources;

wherein allocating the particular compute resource passes control of interactions of the particular interaction type to the receiver entity;

subsequent to the particular time frame, revoking access of the receiver entity to the particular compute resource.

16. The system of claim 15, wherein the one or more parameters comprise a minimum amount of memory availability, wherein the digital twin is specific to the minimum amount of memory, and wherein the particular compute resource is configured to support the particular interaction type with the minimum amount of memory available.

17. The system of claim 15, wherein the one or more parameters comprise a minimum processing power availability, wherein the digital twin is specific to the minimum processing power, and wherein the particular compute resource is configured to support the particular interaction type with the minimum processing power available.

18. The system of claim 15, wherein the one or more parameters comprise a maximum latency, wherein the digital twin is specific to the maximum latency, and wherein the particular compute resource is configured to support the particular interaction type within the maximum latency.

19. The system of claim 15, wherein the one or more parameters are based on a particular geographic location, wherein the digital twin is specific to the particular geographic location, and wherein the particular compute resource is configured to support the particular interaction type within the particular geographic location.

20. The system of claim 15, wherein the compute resource metadata comprises a minimum amount of non-computing resources accepted by the particular provider entity, and wherein the request offers at least the minimum amount of non-computing resources by the receiver entity.

* * * * *

UNITED STATES PATENT AND TRADEMARK OFFICE
CERTIFICATE OF CORRECTION

PATENT NO. : 12,267,254 B2
APPLICATION NO. : 18/654245
DATED : April 1, 2025
INVENTOR(S) : Canney et al.

Page 1 of 1

It is certified that error appears in the above-identified patent and that said Letters Patent is hereby corrected as shown below:

In the Specification

In Column 16, Lines 22-23, delete "Distributed system 500 may also include one or more databases 514 and 516." and insert the same on Column 16, Line 24, as a new paragraph, therefor.

Signed and Sealed this
Seventeenth Day of June, 2025

Coke Morgan Stewart
*Acting Director of the United States Patent and Trademark Office*